United States Patent
Ibsen et al.

(10) Patent No.: US 9,352,813 B2
(45) Date of Patent: May 31, 2016

(54) INFLATABLE FLOATABLE LIFERAFT FOR MARINE RESCUE

(75) Inventors: Christian Ibsen, Tønder (DK); Knud Søndertoft Pedersen, Vejle (DK)

(73) Assignee: Viking Life-Saving Equipment A/S, Esbjerg (DK)

(*) Notice: Subject to any disclaimer, the term of this patent is extended or adjusted under 35 U.S.C. 154(b) by 17 days.

(21) Appl. No.: 14/127,131

(22) PCT Filed: Jun. 15, 2012

(86) PCT No.: PCT/EP2012/061510
§ 371 (c)(1),
(2), (4) Date: Dec. 17, 2013

(87) PCT Pub. No.: WO2012/172082
PCT Pub. Date: Dec. 20, 2012

(65) Prior Publication Data
US 2014/0199901 A1     Jul. 17, 2014

(30) Foreign Application Priority Data

Jun. 17, 2011  (DK) .................................. 2011 70311

(51) Int. Cl.
*B63C 9/04*      (2006.01)
*B63B 1/14*      (2006.01)
(Continued)

(52) U.S. Cl.
CPC ... *B63C 9/04* (2013.01); *B63B 1/14* (2013.01); *B63B 1/34* (2013.01); *B63B 2029/043* (2013.01); *B63C 2009/042* (2013.01);
(Continued)

(58) Field of Classification Search
CPC ............ B63B 7/00; B63B 7/08; B63B 7/082; B63B 35/58; B63C 9/00; B63C 9/08; B63C 9/04

USPC ................................................ 441/40, 42, 45
See application file for complete search history.

(56) References Cited

U.S. PATENT DOCUMENTS 3,131,406 A * 5/1964 Cousteau et al. ............... 441/40
3,473,502 A    10/1969 Wittkamp
(Continued)

FOREIGN PATENT DOCUMENTS

WO      2008131763 A1    11/2008

OTHER PUBLICATIONS

International Searching Authority, International Search Report and Written Opinion issued in corresponding International Application No. PCT/EP2012/061510 dated Oct. 10, 2012, 13 pages.

*Primary Examiner* — Lars A Olson
(74) *Attorney, Agent, or Firm* — Wood, Herron & Evans, LLP

(57) ABSTRACT

The present invention relates to an inflatable floatable liferaft (1) for marine rescue which in its deflated state is capable of being stored in a container on board a ship, vessel or sea installation, and which is inflatable when deployed into the water, the fully inflatable floatable liferaft (1) extending in a longitudinal direction and comprising a non-rigid bottom element (2) having a water side (2*a*) and an air side (2*b*). The inflatable floatable liferaft (1) further comprises a plurality of non-rigid floatation tubes (3) arranged beneath the non-rigid bottom element (2), the non-rigid bottom element (2) extending in the longitudinal direction and being arranged with an intermediate distance (ID1) between neighboring non-rigid floatation tubes (3). The present invention further more relates to improved propulsion through the water of such an inflatable liferaft (1).

23 Claims, 4 Drawing Sheets

(51) Int. Cl.
 *B63B 1/34* (2006.01)
 *B63H 5/08* (2006.01)
 *B63B 29/04* (2006.01)
 *B63H 5/00* (2006.01)
 *B63H 5/125* (2006.01)

(52) U.S. Cl.
 CPC ............ *B63C 2009/044* (2013.01); *B63H 5/08* (2013.01); *B63H 2005/005* (2013.01); *B63H 2005/1254* (2013.01); *Y02T 70/121* (2013.01); *Y02T 70/123* (2013.01)

(56) References Cited

U.S. PATENT DOCUMENTS

| | | | | |
|---|---|---|---|---|
| 4,519,782 | A * | 5/1985 | Fisher | 441/40 |
| 4,894,033 | A * | 1/1990 | Chang | B63B 35/73 440/21 |
| 5,013,270 | A | 5/1991 | Walls | |
| 5,360,186 | A | 11/1994 | Danielson et al. | |
| 6,685,520 | B1 * | 2/2004 | Wiggins | 441/40 |
| 6,848,382 | B1 * | 2/2005 | Bekker | 114/144 B |

\* cited by examiner

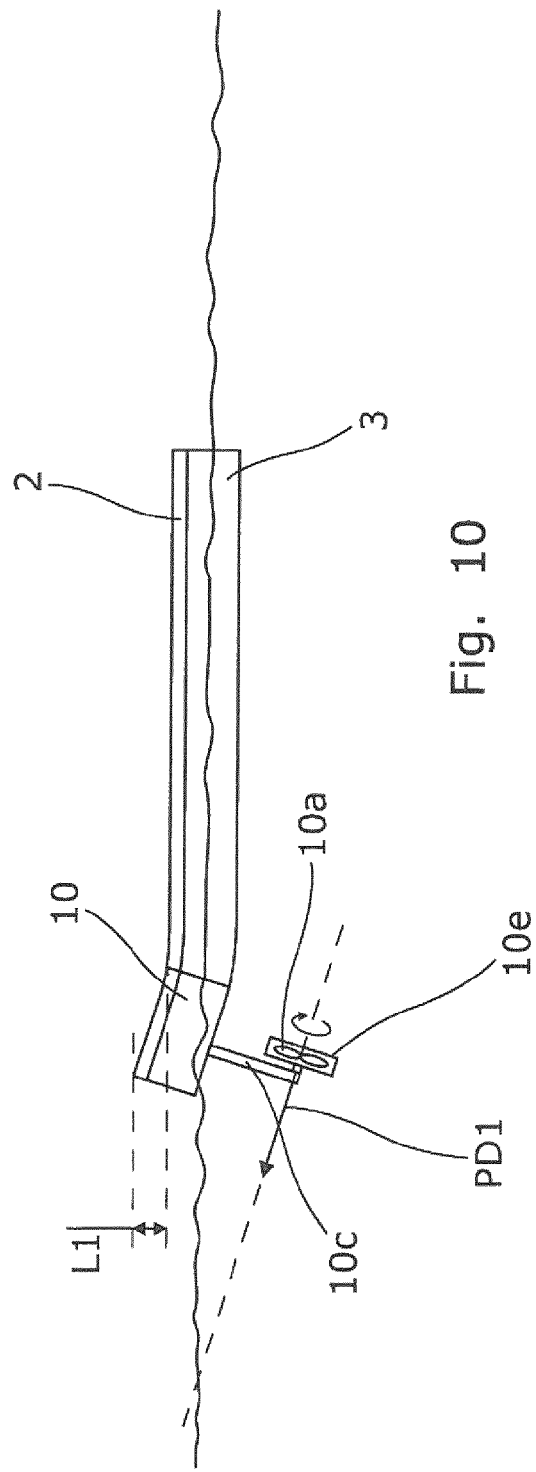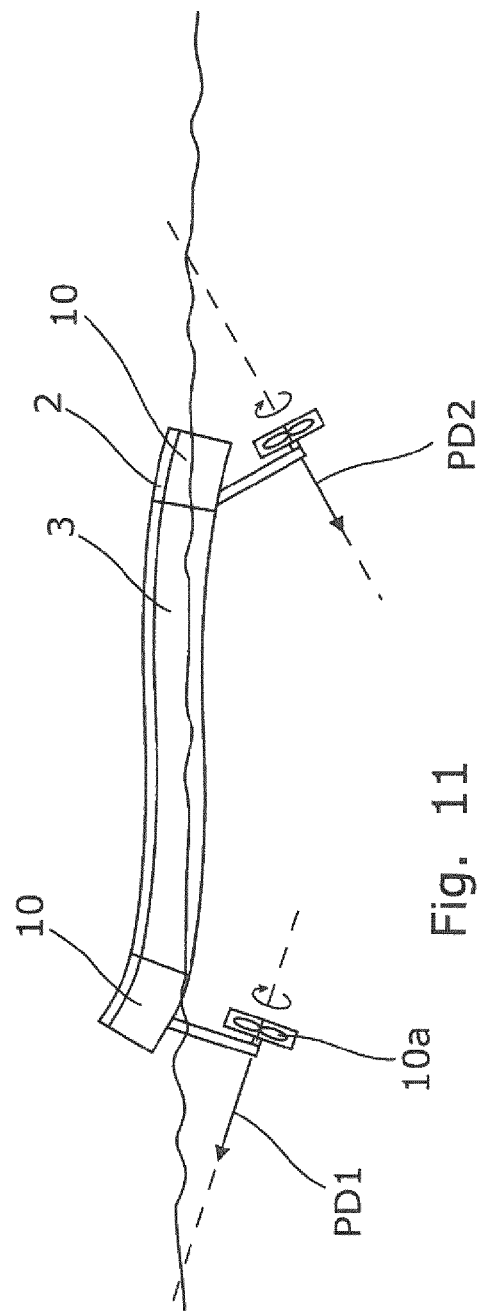

INFLATABLE FLOATABLE LIFERAFT FOR MARINE RESCUE

FIELD OF THE INVENTION

The present invention relates to an inflatable floatable liferaft extending in a longitudinal direction comprising a non-rigid bottom element having a water side and an air side.

BACKGROUND ART

Inflatable liferafts enclosed in self-opening containers are well known and are used as mandatory life-saving equipment throughout the world on almost any commercial ship and vessel.

The term "liferaft" in this application has the meaning "inflatable, lifesaving equipment", such as a liferaft, platform and dinghy.

The liferaft is typically inflated with inflation gas from a gas cylinder. The gas cylinder is attached to the liferaft, and the gas is distributed from the cylinder into the inflatable chambers. Depending on the type and size of the liferaft, there will be one or more gas cylinders connected to the liferaft. Furthermore, the gas from one cylinder can be distributed to one or more inflation inlets on the liferaft.

Chapter III of the International Convention for the Safety of Life at Sea (SOLAS) prescribes that certain types of vessels must carry floatable liferafts on board. The force required for towing these floatable liferafts at a speed of 2 and 3 knots, respectively, must be determined testing and be stated on the floatable liferaft certificate. The latter requirement results from the floatable liferafts having to be towable from a sinking vessel by means of the MOB/FRC boats of the vessel or by the lifeboats. This means that the authority approving the evacuation equipment of the vessel must ensure that the lifeboats are able to exhibit the force required to tow the biggest floatable liferaft on the vessel. Especially in the case of large floatable liferafts, a high force is required, meaning that the MOB/FRC boats must be designed with large engine powers to ensure compliance with the requirements. Since there is an increased need for larger floatable liferafts to match vessels continuously increasing in passenger capabilities, such as cruise ships and large ferry boats, floatable liferafts may advantageously be increased in size. However, when known non-rigid vessels are increased in size to a certain dimension, they become practically impossible to move through the water with sufficient speeds due to extremely high drag forces from the water.

Hence, there is a need for an inflatable floatable liferaft which meets all the above statutory requirements as well as other requirements.

SUMMARY OF THE INVENTION

It is an object of the present invention to wholly or partly overcome the above disadvantages and drawbacks of the prior art. More specifically, it is an object to provide an improved inflatable floatable liferaft, which has a low force, allowing an increased size of the floatable liferaft.

The above objects, together with numerous other objects, advantages, and features, which will become evident from the below description, are accomplished by a solution in accordance with the present invention by an inflatable floatable liferaft for marine rescue which in its deflated state is capable of being stored in a container on board a ship, vessel or sea installation, and which is inflatable when deployed into the water, the fully inflatable floatable liferaft (1) extending in a longitudinal direction and comprising a non-rigid bottom element having a water side and an air side, wherein the inflatable floatable liferaft further comprises a plurality of non-rigid floatation tubes arranged beneath the non-rigid bottom element, the non-rigid floatation tubes (3) extending in the longitudinal direction being arranged with an intermediate distance between neighbouring non-rigid floatation tubes.

In one embodiment, the intermediate distance between two neighbouring non-rigid floatation tubes may be longer than an average of a first width of one of the neighbouring non-rigid floatation tubes and a second width of the other of the neighbouring non-rigid floatation tubes.

In another embodiment, the water side of the non-rigid bottom element may be above sea level when the floatable liferaft is fully loaded with passengers.

Also, the inflatable floatable liferaft may have a drag coefficient $C_d$ below 1 at a speed of more than 3 knots, and more preferably a drag coefficient $C_d$ below 0.75 at a speed of more than 3.5 knots, or even more preferably a drag coefficient $C_d$ below 0.5 at a speed of more than 4 knots.

Moreover, the non-rigid floatation tubes may have a bow end and a stern end, and at least the bow end may have a drag-reducing end shape, such as a cone shape or other tapered shape.

In one embodiment, the drag-reducing end shape may be constituted by floatation tube side walls sealed in a substantially vertical bond at the bow end, constituting a vertical keel shape or a vertical bow shape.

Further, the surfaces of the inflatable non-rigid floatation tubes may comprise a drag-reducing coating, such as a water ablative paint or coating.

The inflatable floatable liferaft according to the present invention may further comprise propulsion means.

Additionally, the inflatable floatable liferaft according to the present invention may further comprise at least two propulsion means arranged in a bow starboard position of the floatable liferaft and in a bow port position of the floatable liferaft.

Furthermore, the inflatable floatable liferaft according to the present invention may comprise at least four propulsion means arranged in a bow starboard position, in a bow port position, in a stern starboard position and in a stern port position of the floatable liferaft.

In one embodiment, the propulsion means arranged in the bow starboard position and in the bow port position of the floatable liferaft may have a non-level bow propulsion direction pointing towards the water surface when the floatable liferaft is in forward motion to oppose drag effects.

The propulsion means arranged in the bow starboard position and in the bow port position of the floatable liferaft may have the non-level bow propulsion direction pointing towards the water surface, and the propulsion means arranged in the stern starboard position and in the stern port position of the floatable liferaft may have a non-level stern propulsion direction pointing away from the water surface when the floatable liferaft is in forward motion to oppose drag effects.

In one embodiment, the non-level bow and stern propulsion directions may be controlled automatically or by a user as a function of the speed of the floatable liferaft.

Also, the propulsion means may be arranged within a protecting shell.

The inflatable floatable liferaft according to the present invention may further comprise a plurality of protecting shells.

Additionally, the ballast means extending in the longitudinal direction may be arranged below and attached to the inflatable non-rigid floatation tubes in the longitudinal direction.

Moreover, seating arrangements may be are arranged on the air side of the non-rigid bottom element.

Further, seating arrangements may be arranged on the air side of the non-rigid bottom element between two neighbouring floating tubes.

Also, the inflatable tubes may be made of a polymeric material, such as natural rubber (NR), polyurethane (PU), thermoplastic poly urethane (TPU), butyl rubber (BR), polyvinylchloride (PVC), polychloroprene (CR), polyethylene (PE), or a combination thereof.

In an embodiment, the inflatable floatable liferaft may preferably have an aspect ratio between length and width above 3:2, more preferably above 7:4, and even more preferably above 2:1.

Furthermore, the inflatable floatable liferaft may have a capacity of at least 150 persons, more preferably more than 200 persons, and even more preferably more than 300 persons.

Moreover, the inflatable floatable liferaft may preferably have a dimension of the inflatable floatable liferaft above 10 meters in length and 6 meters in width, more preferably above 12 meters in length and 7 meters in width, and even more preferably above 14 meters in length and 8 meters in width.

In addition, the inflatable floatable liferaft may preferably have a floating capacity of more than 10.000 kilos, more preferably more than 20.000 kilos, and even more preferably above 30.000 kilos in weight.

The propeller is preferably lowered away from the bottom of the inflatable floatable liferaft in order to propel through water substantially not affected by the turbulence of the water created near the bottom. The propeller is preferably not lowered too deep due to moment arm considerations. The propeller is preferably lowered to a point of approximately 40 centimeters below the bottom.

The inflatable floatable liferaft has a preferable aspect ratio between length and width of close to 3:2. With a person capacity of 200 persons, a preferable dimension of the inflatable floatable liferaft is 12 meters in length and 8 meters in width. A substantially rectangular shape such as a 3:2 ratio rectangle is preferable.

The non-rigid floatation tubes may preferably have a cross-sectional width of between 40 and 60 centimeters and may be spaced at a mutual distance of from 60 to 100 centimeters.

The non-rigid floatation tubes may preferably have a rough surface to lower drag effects by having characteristics similar to shark skin.

BRIEF DESCRIPTION OF THE DRAWINGS

The invention and its many advantages will be described in more detail below with reference to the accompanying schematic drawings, which for the purpose of illustration show some non-limiting embodiments and in which
FIG. 10 shows a cross-sectional view of a floatable liferaft,
and
FIG. 11 shows a cross-sectional view of a floatable liferaft.

All the figures are highly schematic and not necessarily to scale, and they show only those parts which are necessary in order to elucidate the invention, other parts being omitted or merely suggested.

DETAILED DESCRIPTION OF THE INVENTION

Figure 1:
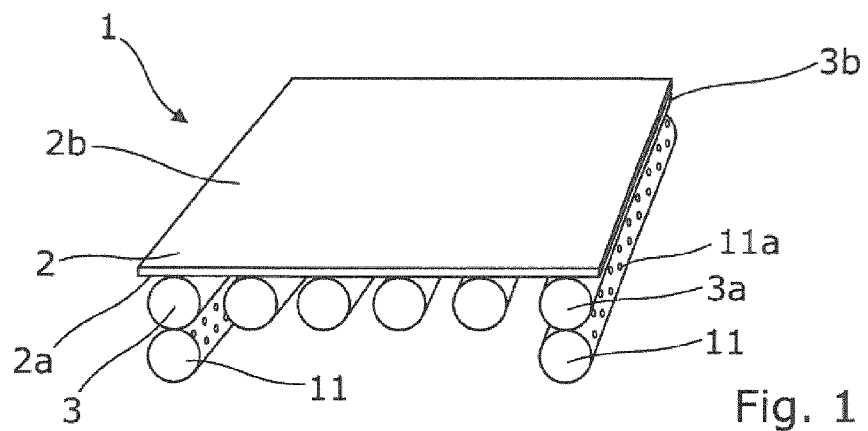
FIG. 1 shows a perspective view of a floatable liferaft.

FIG. 1 shows an inflatable floatable liferaft 1 which, in its deflated state, is stored in a container on board a ship, vessel or offshore facility, and which is inflated when deployed into the water. Liferafts are by and large inflatable and therefore require a minimum of space in the deflated state when stored on board the ship, vessel or offshore facility. Furthermore, they are able to carry a maximum number of people when deployed into the water in the inflated state. Such liferafts are preferably very extensive and are designed to carry hundreds of people and several thousands of kilos. Moving such extensive liferafts through the water is very difficult, even at relatively low speeds, since the liferafts are by and large made from inflatable non-rigid materials. Using non-rigid materials to provide stability of the liferaft is very problematic for liferafts of this size if they have to be able to move through the water. It is therefore an object of the invention to provide a liferaft by and large made from non-rigid materials without compromising the ability to move through the water. The lack of rigidness is problematic due to the high drag forces from the water on the liferaft when moving the liferaft through the water. When the liferaft has been fully loaded with passengers during a rescue situation, it is essential to the safety of the people on the liferaft that the liferaft can be sailed away, e.g. from a shipwreck, to avoid burning oil, suction forces from a sinking ship, tilting of the ship etc. To this effect, the floatable liferaft extends in a longitudinal direction and comprises a non-rigid bottom element 2 having a water side 2a and an air side 2b, on which non-rigid bottom element passengers may be carried during a rescue operation at sea. The inflatable floatable liferaft further comprises a plurality of non-rigid floatation tubes 3 arranged beneath the non-rigid bottom element 2, extending in the longitudinal direction to provide buoyancy over the width of the floatable liferaft and to decrease the drag of the floatable liferaft when the floatable liferaft is moved through the water. The plurality of non-rigid floatation tubes 3 may be arranged across the non-rigid bottom element 2 with an intermediate distance ID1 between neighbouring non-rigid floatation tubes 3 of at least the average of the widths D1, D2 of the neighbouring tubes such that the following expression is fulfilled:

$$ID1 > (D1+D2)/2$$

By ensuring that the intermediate distance ID1 is valid in the above expression, the inflatable floatable liferaft may have a drag coefficient $C_d$ below 1 at speeds of more than 3 knots, such as more preferably a drag coefficient $C_d$ below 0.75 at speeds of more than 3.5 knots, or even more preferably a drag coefficient $C_d$ below 0.5 at speeds of more than 4 knots.

When referring to non-rigid bottom elements and non-rigid flotation tubes, "non-rigid" refers to materials which may be compressed and packed up in a very small volume when the liferaft is in the deflated state, and which may furthermore be expanded and unpacked very quickly by inflation. Examples of non-rigid materials are polyethylene, natural or synthetic rubbers, polyesters, neoprene, hypalon, polymers and/or combinations thereof. These materials are well known in the art of life rafts.

The liferaft is made for evacuation purposes, and it therefore has a deflated storage configuration and an inflated deployed configuration. The liferaft comprises non-rigid flotation tubes and a non-rigid bottom element forming a 3-dimensional space frame when the liferaft is in the inflated deployed configuration.

The liferaft is preferably able to carry more than 10.000 kilos, and more preferably more than 20.000 kilos, and even more preferably more than 30.000 kilos, and still be moved through the water at speeds exceeding 2 knots without being dragged down into the water in the a front end of the liferaft.

Figure 2:
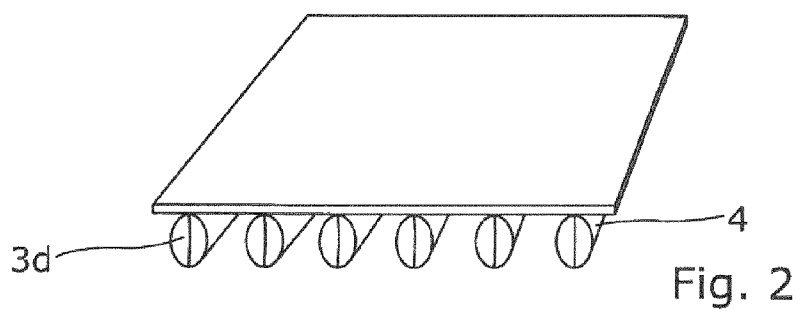
FIG. 2 shows a perspective view of a floatable liferaft.
Figure 3:
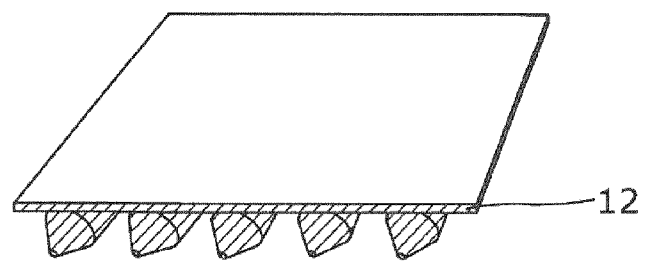
FIG. 3 shows a perspective view of a floatable liferaft.
Figure 4:
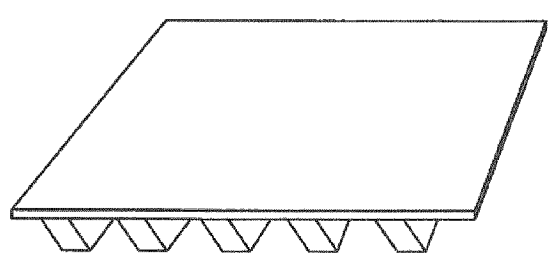
FIG. 4 shows a perspective view of a floatable liferaft.

FIGS. 2-4 show floatable liferafts wherein the non-rigid floatation tubes 3 have a bow end 3a and a stern end 3b, and at least the bow end 3a has a drag-reducing end shape. FIG. 2 shows a drag-reducing end shape with a vertical keel type shape, which drag-reducing end shape may be constituted by floatation tube side walls 4 sealed in a substantially vertical bond at the bow end 3a. FIG. 3 shows a cone-shaped, drag-reducing end shape. FIG. 4 shows a non-rigid floatation tube 3 with a polygon cross-section and a tapered end shape.

FIG. 3 shows an inflatable floatable liferaft wherein surfaces of the inflatable floatable liferaft which may be in water contact during propulsion through the water are coated with a drag-reducing coating 12, such as a water ablative paint.

Figure 5:
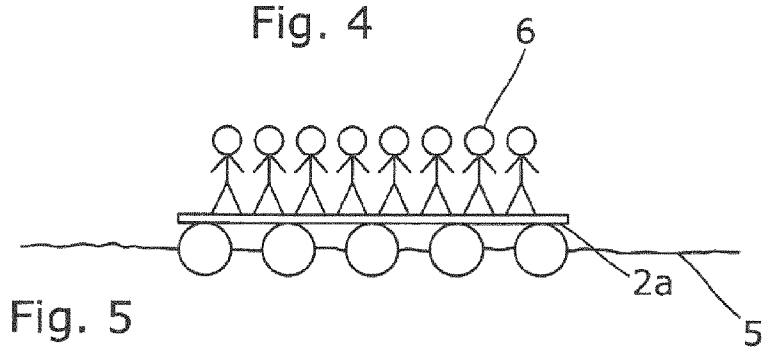
FIG. 5 shows a schematic diagram of a floatable liferaft loaded with passengers.

FIG. 5 shows a floatable liferaft fully loaded with passengers 6 wherein the water side 2a of the non-rigid bottom element 2 is kept above sea level 5. Keeping the non-rigid bottom element 2 "out of the water" significantly reduces the overall drag coefficient of the floatable liferaft 1 since the total area of the floatable liferaft perpendicular to the direction of propulsion in the water is lowered.

Figure 6:
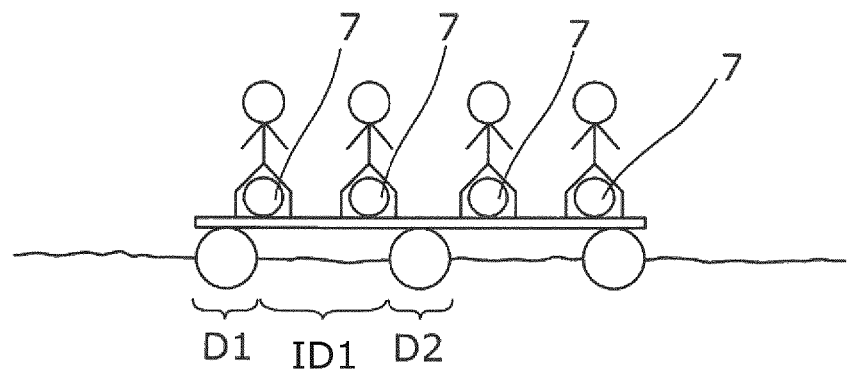
FIG. 6 shows a schematic diagram of a floatable liferaft loaded with passengers.

FIG. 6 shows an inflatable floatable liferaft 1 wherein seating arrangements 7 are arranged on the air side 2b of the non-rigid bottom element 3. In order for the passengers to endure a longer stay in the floatable liferaft, seating arrangements for comfort and isolation from the sea water may be arranged in the floatable liferaft on the air side 2b of the non-rigid bottom element 3. Seating arrangements 7, such as long tubes 7, may further have the advantage of providing a close packing of the passengers 6, which allows for a high number of passengers 6 on a small area, thus giving the passengers the possibility of keeping warm by sitting close in a "spoon" position with co-passengers in front and behind. As shown also in FIG. 8, the seating arrangements 7 may preferably be arranged on the air side 2b of the non-rigid bottom element 2 between two neighbouring floating tubes 3 in order to stabilise the structure of the floatable liferaft and in order for the passengers 6 to be able to walk on the non-rigid bottom element 2 in areas where the non-rigid bottom element 2 is braced by the non-rigid floatation tubes 3. By instead arranging the seating arrangements 7 on the air side 2b of the non-rigid bottom element 2 on top of the non-rigid floatation tubes 3, the seating arrangements will have maximum buoyancy beneath them. The seating arrangements may also be arranged irrespective of the position of the non-rigid floatation tubes, e.g. if the number of seating arrangement tubes 7 is larger than the number of non-rigid floatation tubes 3 or vice versa.

The inflatable floatable liferaft is stabilised by the weight of the passengers entering the liferaft, meaning that the more passengers entering the boat, the more stable the liferaft will be in the water.

Seating arrangements 7 may contribute to the buoyancy of the floatable liferaft. Since seating arrangements 7 are advantageously made from inflatable structures, the seating arrangements 7 may contribute to the buoyancy when necessary. This may be advantageous in the case of failure of some of the non-rigid floatation tubes 3 or during overload of a floatable liferaft, e.g. due to failure of the deployment of one or more floatable liferafts during a rescue operation, resulting in the rest of the floatable liferafts having to carry a number of passengers exceeding the dimensioned passenger capacity, causing more buoyancy to be required.

Figure 7:
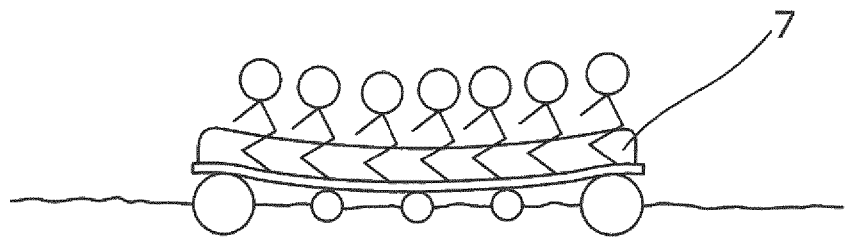
FIG. 7 shows a schematic diagram of a floatable liferaft loaded with passengers.

FIG. 7 shows a floatable liferaft 1 in which the seating arrangements 7 are arranged transversely to the longitudinal direction of the floatable liferaft 1. This may be done to increase rigidity of the floatable liferaft.

Figure 8:
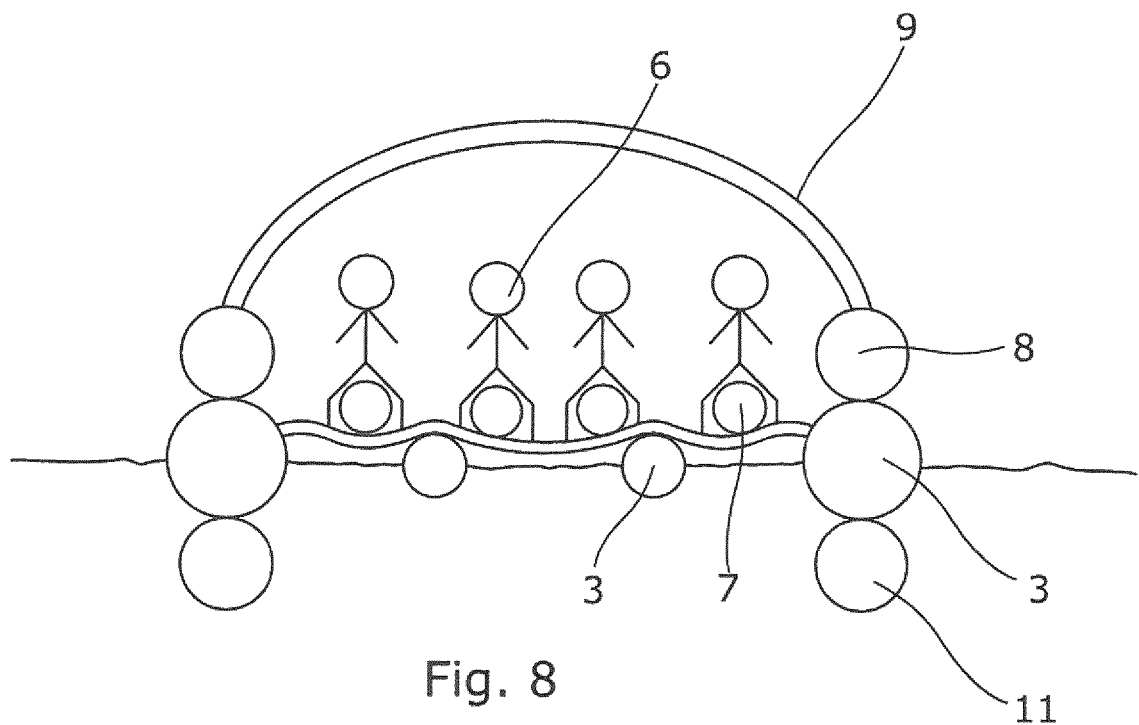
FIG. 8 shows a schematic diagram of a floatable liferaft loaded with passengers.

In FIG. 8, the floatable liferaft 1 further comprises a border element 8 and a roof element 9. Use of border elements in floatable liferafts is well known, and they are primarily used to prevent sea waves from causing water to enter the floatable liferaft. However, in order to ensure rescue operations in non-coastal zones, a roof element may be used. Together with the border element 8, the roof element 9 may completely protect the passengers 6 from high waves, rain, sleet or snow. Especially in arctic regions or in cold conditions, this may be crucial to the safety of the passengers.

Figure 9:
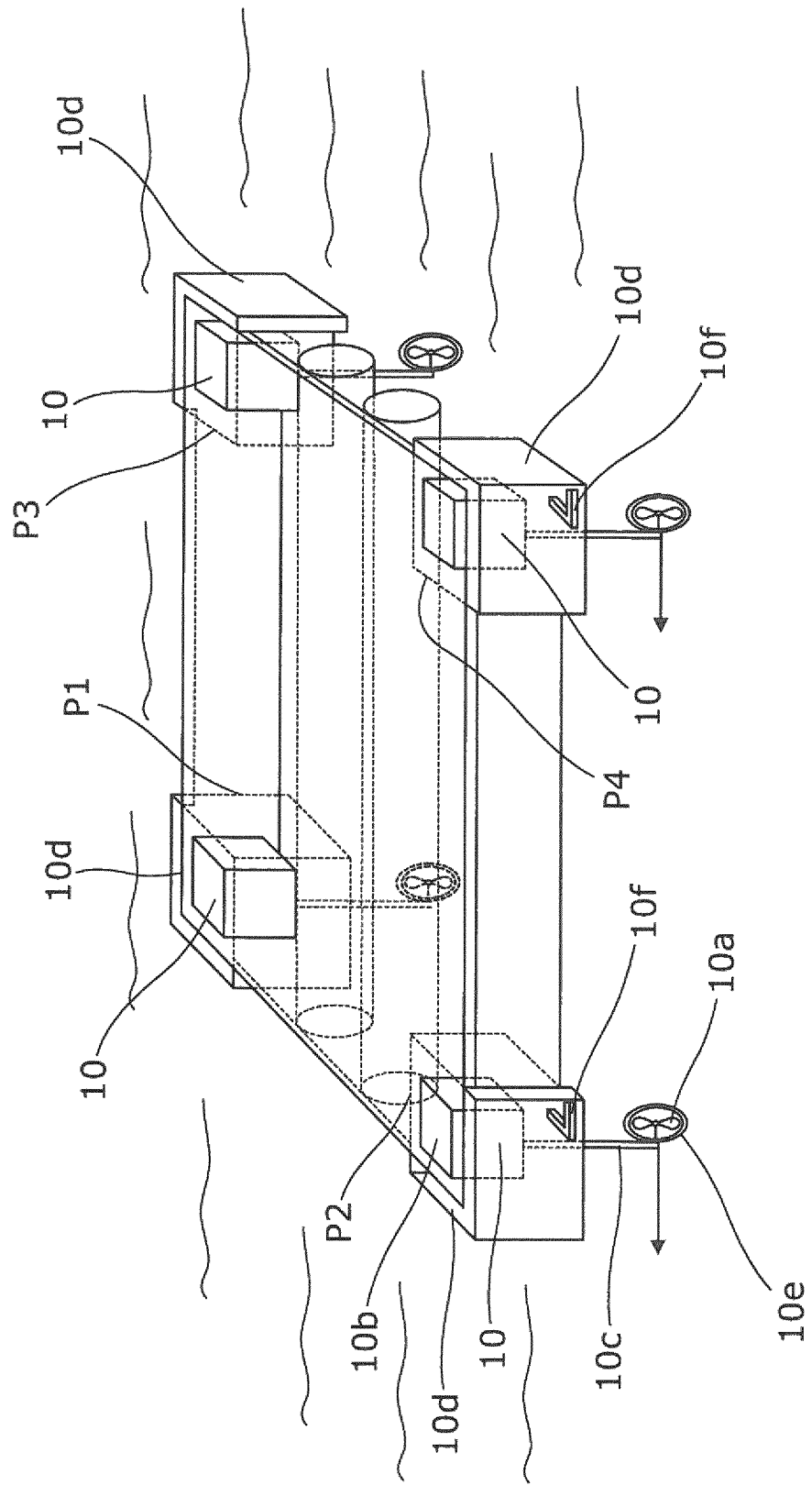
FIG. 9 shows a transparent perspective view of a floatable liferaft.

FIG. 9 shows a floatable liferaft with on-board propulsion means 10. As explained above, floatable liferafts are, according to SOLAS, required to be towable from a sinking vessel by means of the MOB/FRC boats of the vessel or by the floatable liferaft itself. To enable propulsion of the floatable liferaft, on-board propulsion means may be arranged in the floatable liferaft, e.g. in corners of the floatable liferaft, as shown in FIG. 9. FIG. 9 shows a floatable liferaft with four propulsion means arranged in a bow starboard position, in a bow port position, in a stern starboard position and in a stern port position of the floatable liferaft. To protect a propeller 10a of the propulsion means 10, the propeller 10a may be retracted (not shown) by propeller extraction means 10c when the floatable liferaft is in its deflated state and stored in a container onboard a ship or vessel. When the floatable liferaft is deployed into the water and inflated, the propeller may be extracted by the propeller extraction means 10c, as shown in FIG. 9. When the propeller extraction means 10a are extracted, the propeller 10a may start to rotate when the propeller 10a is at a sufficient distance to the non-rigid floatation tubes 3, thereby providing a propelling force to the floatable liferaft. Furthermore, as shown in FIG. 9, the floatable liferaft may comprise protecting shells 10d to ensure that the propulsion means 10 is not damaged in its deflated state when packed in a container. Furthermore, connecting means 10f may be arranged on the protecting shells 10d to allow several floatable liferafts to be attached tightly to one another, which may be advantageous during embarkment of passengers onto the floatable liferaft.

The protecting shells 10d may further be adapted to accommodate the floatable liferaft in its deflated state to protect the inflatable parts of the liferaft. Furthermore, supplies for first aid, power sources, nutrition and equipment for signalling maritime distress may be contained within the protecting shells 10d.

FIG. 10 shows a floatable liferaft with propulsion means 10 arranged in the bow end 3a of the non-rigid floatation tubes 3. By ensuring that a bow direction of propulsion DP1 is aiming slightly towards the sea surface 5, an extra lifting force is provided to oppose the dragging effects trying to "dip" the bow end of the floatable liferaft when the floatable liferaft is in forward motion. The direction of propulsion may be altered by altering the direction of rotation of the propeller 10a, i.e. by changing the angle of the motor with respect to level, or by using a directional propeller system, such as a ducted propeller system. The degree of lift provided by changing the direction of propulsion DP1 may be varied by the user of the floatable liferaft or be automatically varied as a function of the water speed, i.e. the speed of the floatable liferaft through the water as opposed to ground speed which is the speed of the vessel over ground. The faster the water speed of the floatable liferaft, the more the bow end will be pulled down into the water by drag effects, which will increase the usefulness of a lifting force from the propulsion means 10.

The propeller 10a may advantageously be covered by an appropriate grate member 10e, as shown in FIG. 10. Since passengers may be in the water during a rescue operation, a freely rotating propeller may cause potential danger to passengers in the water, and the propeller 10a may therefore be shielded by a grating member.

FIG. 11 shows a floatable liferaft with propulsion means 10 arranged in both the bow end 3a and the stern end 3b of the non-rigid floatation tubes 3. By placing several propulsion means 10 in different positions of the floatable liferaft, the propulsion force may be exerted from all these positions. In a rigid structure like a conventional speed boat, this would not be advantageous, e.g. because four small motors perform worse than one motor four times as big. However, when using inflatable structures for rafts sailing through water, the lack of rigidity becomes a concern. Therefore, in order to avoid too much deformation of the floatable liferaft 1, the propulsion means 10 may advantageously be divided into smaller propulsion means 10. Furthermore, this division helps the redundancy of the system since the raft may still be propelled through the water in case of some of the propulsion means malfunctioning. With respect to the position of the floatable liferaft 1 in the water, the propulsion means arranged in the bow end of the non-rigid floatation tubes 3 may add additional lift to the floatable liferaft in the bow end. The propulsion means 10 arranged in the stern end of the floatable liferaft 1 may be used to control the position of the floatable liferaft in the water by forcing the stern end of the floatable liferaft deeper into the water. This may, depending on the rigidity of the floatable liferaft, also increase the bow end of the floatable liferaft, thereby also counteracting the "dip" of the bow end due to drag effects when the floatable liferaft is propelled through the water.

FIGS. 1 and 8 show a floatable liferaft furthermore comprising ballast means 11 arranged below and attached to the inflatable non-rigid floatation tubes 3. The ballast means 11 may be hollow tubes 11 with holes 11a allowing water to enter the ballast means. The ballast means 11 are arranged below the non-rigid floatation tubes 3 to provide additional stability to the floatable liferaft, which is especially important in rough weather.

The non-rigid floatation tubes 3 may contribute to the strength and rigidity of the floatable liferaft in the longitudinal direction. The roof elements 9 may also contribute to the strength and rigidity of the floatable liferaft in the longitudinal direction as well as transversely to the longitudinal direction. The roof elements 9 may improve the strength and rigidity of the floatable liferaft by constituting a cage type structure on top of the non-rigid bottom element 2.

An advantage of a length:width aspect ratio near 3:2 of the inflatable floatable liferaft is that the stability is reasonable compared with the drag induced by the area transverse to the sail direction. If the liferaft is too narrow, drag effects are low, but stability is poor, whereas if the liferaft is wide, the stability is good, but the area transverse to the sail direction is large. Furthermore, an aspect ratio near 3:2 resembles a boat-like structure easily recognised at sea.

Although the invention has been described in the above in connection with preferred embodiments of the invention, it will be evident for a person skilled in the art that several modifications are conceivable without departing from the invention as defined by the following claims.

The invention claimed is:

1. An inflatable floatable liferaft for marine rescue which in its deflated state is capable of being stored in a container on board a ship, vessel or sea installation, and which is inflatable when deployed into the water, the fully inflatable floatable liferaft extending in a longitudinal direction and comprising a non-rigid bottom element having a water side and an air side, wherein the inflatable floatable liferaft further comprises a plurality of non-rigid floatation tubes arranged beneath the non-rigid bottom element, the non-rigid floatation tubes extending in the longitudinal direction and being arranged with an intermediate distance between neighboring non-rigid floatation tubes, and wherein the inflatable floatable liferaft further comprises a propeller-driven propulsion device.

2. The inflatable floatable liferaft according to claim 1, wherein the intermediate distance between two neighboring non-rigid floatation tubes is longer than an average of a first width of one of the neighboring non-rigid floatation tubes and a second width of the other of the neighboring non-rigid floatation tubes.

3. The inflatable floatable liferaft according to claim 1, wherein the water side of the non-rigid bottom element is above sea level when the floatable liferaft is fully loaded with passengers.

4. The inflatable floatable liferaft according to claim 1, wherein the inflatable floatable liferaft has a drag coefficient Cd below 1 at a speed of more than 3 knots.

5. The inflatable floatable liferaft according to claim 1, wherein the non-rigid floatation tubes have a bow end and a stern end, and at least the bow end has a drag-reducing end shape.

6. The inflatable floatable liferaft according to claim 5, wherein the drag-reducing end shape is constituted by floatation tube side walls sealed in a substantially vertical bond at the bow end, constituting a vertical keel shape or a vertical bow shape.

7. The inflatable floatable liferaft according to claim 1, wherein the surfaces of the inflatable non-rigid floatation tubes comprise a drag-reducing coating.

8. The inflatable floatable liferaft according to claim 1, further comprising at least two propulsion devices arranged in a bow starboard position of the floatable liferaft and in a bow port position of the floatable liferaft.

9. The inflatable floatable liferaft according to claim 1, further comprising at least four propulsion devices arranged in a bow starboard position, in a bow port position, in a stern starboard position and in a stern port position of the floatable liferaft.

10. The inflatable floatable liferaft according to claim 8, wherein the propulsion devices arranged in the bow starboard position and in the bow port position of the floatable liferaft have a non-level bow propulsion direction pointing towards the water surface when the floatable liferaft is in forward motion to oppose drag effects.

11. The inflatable floatable liferaft according to claim 8, wherein the propulsion devices arranged in the bow starboard position and in the bow port position of the floatable liferaft have a non-level bow propulsion direction pointing towards the water surface, and wherein the propulsion devices arranged in the stern starboard position and in the stern port position of the floatable liferaft have a non-level stern propulsion direction pointing away from the water surface when the floatable liferaft is in forward motion to oppose drag effects.

12. The inflatable floatable liferaft according to claim 10, wherein the non-level bow and stern propulsion directions may be controlled automatically or by a user as a function of the speed of the floatable liferaft.

13. The inflatable floatable liferaft according to claim 1, wherein the propulsion device is arranged within a protecting shell.

14. The inflatable floatable liferaft according to claim 1, further comprising a plurality of protecting shells.

15. The inflatable floatable liferaft according to claim 1, wherein a ballast extending in the longitudinal direction is arranged below and attached to the inflatable non-rigid floatation tubes in the longitudinal direction.

16. The inflatable floatable liferaft according to claim 1, wherein seating arrangements are arranged on the air side of the non-rigid bottom element.

17. An inflatable floatable liferaft for marine rescue which in its deflated state is capable of being stored in a container on board a ship, vessel or sea installation, and which is inflatable when deployed into the water, the fully inflatable floatable liferaft extending in a longitudinal direction and comprising a non-rigid bottom element having a water side and an air side, wherein the inflatable floatable liferaft further comprises a plurality of non-rigid floatation tubes arranged beneath the non-rigid bottom element, the non-rigid floatation tubes extending in the longitudinal direction and being arranged with an intermediate distance between neighboring non-rigid floatation tubes, wherein the inflatable floatable liferaft further comprises a propulsion device, and wherein inflatable seating arrangement tubes are arranged on the air side of the non-rigid bottom element, the seating arrangement tubes extending parallel to the floatation tubes and between two neighbouring flotation tubes.

18. The inflatable floatable liferaft according to claim 1, wherein the inflatable tubes are made of a polymeric material.

19. The inflatable floatable liferaft according to claim 1, wherein the inflatable floatable liferaft has an aspect ratio between length and width above 3:2.

20. The inflatable floatable liferaft according to claim 1, wherein the inflatable floatable liferaft has a capacity of at least 150 persons.

21. The inflatable floatable liferaft according to claim 1, wherein the inflatable floatable liferaft has a dimension of the inflatable floatable liferaft above 10 meters in length and above 6 meters in width.

22. The inflatable floatable liferaft according to claim 1, wherein the inflatable floatable liferaft has a floating capacity of more than 10,000 kilos.

23. An inflatable floatable liferaft for marine rescue which in its deflated state is capable of being stored in a container on board a ship, vessel or sea installation, and which is inflatable when deployed into the water, the fully inflatable floatable liferaft extending in a longitudinal direction and comprising a non-rigid bottom element having a water side and an air side, wherein the inflatable floatable liferaft further comprises a plurality of non-rigid floatation tubes arranged beneath the non-rigid bottom element, the non-rigid floatation tubes extending in the longitudinal direction and being arranged with an intermediate distance between neighboring non-rigid floatation tubes, and wherein the inflatable floatable liferaft further comprises a propulsion device arranged in a bow position of the inflatable floatable liferaft and having a non-level bow propulsion direction pointing towards the water surface, and a propulsion device arranged in a stern position of the inflatable floatable liferaft and having a non-level stern propulsion direction pointing away from the water surface when the floatable inflatable liferaft is in forward motion to oppose drag effects.

* * * * *